US012226701B2

(12) United States Patent
Kipnis et al.

(10) Patent No.: US 12,226,701 B2
(45) Date of Patent: Feb. 18, 2025

(54) GAME ANALYTICS USING NATURAL LANGUAGE PROCESSING

(71) Applicant: GOOGLE LLC, Mountain View, CA (US)

(72) Inventors: Anna Kipnis, San Bruno, CA (US); Ji Hun Kim, Mountain View, CA (US); Daniel Cary, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 125 days.

(21) Appl. No.: 17/769,977

(22) PCT Filed: May 15, 2020

(86) PCT No.: PCT/US2020/033041
§ 371 (c)(1),
(2) Date: Apr. 18, 2022

(87) PCT Pub. No.: WO2021/216099
PCT Pub. Date: Oct. 28, 2021

(65) Prior Publication Data
US 2022/0370913 A1 Nov. 24, 2022

Related U.S. Application Data

(60) Provisional application No. 63/012,365, filed on Apr. 20, 2020.

(51) Int. Cl.
*A63F 13/67* (2014.01)
(52) U.S. Cl.
CPC .................................. *A63F 13/67* (2014.09)

(58) Field of Classification Search
None
See application file for complete search history.

(56) References Cited

U.S. PATENT DOCUMENTS

2012/0142429 A1  6/2012  Muller
2014/0358964 A1  12/2014  Woods et al.
(Continued)

FOREIGN PATENT DOCUMENTS

WO   2017066029 A1   4/2017

OTHER PUBLICATIONS

International Preliminary Report on Patentability mailed Nov. 3, 2022 for PCT Application No. PCT/US2020/033041, 9 pages.
(Continued)

*Primary Examiner* — Jason T Yen

(57) ABSTRACT

A processor executes program code that represents a portion of a video game and adds a sequence of text strings that represent game events to a text log during execution of the program code. The processor (or another processor that has access to the text log) performs a natural language processing (NLP) analysis of the text log to determine one or more characteristics of the portion of the video game. In some cases, the NLP analysis includes a sentiment analysis that attempts to determine characteristics of a player's experience while playing the video game, summarization technology that creates a human-readable summary of an aspect of the game or a portion of the video game, a semantic NLP ML algorithm in the semantic similarity modality to answer questions regarding the player's experience during the video game, or grouping players in a multiplayer game based on in-game behavior.

25 Claims, 8 Drawing Sheets

(56) References Cited

U.S. PATENT DOCUMENTS

| | | | |
|---|---|---|---|
| 2015/0190719 A1* | 7/2015 | Chowdhary | A63F 13/67 |
| | | | 463/31 |
| 2015/0231502 A1* | 8/2015 | Allen | A63F 13/47 |
| | | | 463/42 |
| 2016/0220903 A1 | 8/2016 | Miller et al. | |
| 2017/0340962 A1* | 11/2017 | Jones | A63F 13/335 |
| 2018/0276111 A1* | 9/2018 | Datta | G06F 11/3664 |
| 2019/0083876 A1 | 3/2019 | Morton et al. | |
| 2019/0251603 A1* | 8/2019 | Jaatinen | G06N 3/006 |
| 2020/0327047 A1* | 10/2020 | Mayhew | A63F 13/77 |

OTHER PUBLICATIONS

International Search Report and Written Opinion mailed Aug. 4, 2020 for corresponding International Application No. PCT/US2020/033041, 13 pages.

Cheong, Y. et al., "Automatically Generating Summary Visualizations from Game Logs", Proceedings of the Fourth Artificial Intelligence and Interactive Digital Entertainment Conference; Oct. 24, 20008; retrieved from the Internet <<http://www.aaai.org/Papers/AIIDE/2008/AIIDE08-028.pdf>>; abstract; figure 2.

Mateas, M. et al., "Natural Language Understanding in FaA ade: Surface-Text Processing", Technologies for Interactive Digital Storytelling and Entertainment; Jun. 10, 2004; pp. 3-13.

Yuya, H. et al., "Werewolf Game Modeling Using Action Probabilities Based on Play Log Analysis", Annual International Conference on the Theory and Applications of Cryptographic Techniques, Eurocrypic 2018; Dec. 10, 2016; pp. 103-114 (p. 2, bottom paragraph).

* cited by examiner

GAME ANALYTICS USING NATURAL LANGUAGE PROCESSING

CROSS-REFERENCE TO RELATED APPLICATIONS

The present application is a U.S. National Stage under 35 U.S.C. § 371 of International Patent Application Serial No. PCT/US2020/033041, entitled "GAME ANALYTICS USING NATURAL LANGUAGE PROCESSING" and filed on May 15, 2020, which claims priority to U.S. Provisional Application No. 63/012,365, entitled "GAME ANALYTICS USING NATURAL LANGUAGE PROCESSING" and filed on Apr. 20, 2020, the entireties of which are incorporated by reference herein.

BACKGROUND

The development process for a videogame typically includes a number of iterations of player testing and feedback that are used to refine gameplay. One frequently used technique for gathering feedback from players is to recruit beta testers or focus groups to play the game and then conduct interviews to investigate how the players felt about different aspects of the gameplay. The feedback is used to gain insights into how players experience the game, particularly if the player experience is contrary to the goals of the game designer. For example, feedback can reveal whether players generally enjoy the game experience, as well as how their experience of the game changes through the course of the game. For another example, feedback can reveal that a large percentage of players decide to stop playing the game at a certain point and these players ultimately do not continue with the game. This feedback allows the developers to modify the game to improve the player experience before general release. However, focus groups and the subsequent interviews are time and resource intensive and are therefore used relatively infrequently, e.g., at relatively late stages of game development when a high-quality beta version is available for testing, or at a relatively high granularity, e.g., to examine the players' overall impressions of the game mechanics or narrative.

SUMMARY

Game developers use analytics systems that log player actions and game events. However, the game developers are required to specify a set of actions and events to monitor and then add appropriate analytics measurement code to the game to log information associated with each action or event in the predetermined set. Insights are then derived from an analysis of the logged information. The quality of the insights is dependent on the quality of the analytics system encoded into the game. Shortcomings in the design or implementation of the analytics system can result in lost data that cannot be recovered because it was never captured. Conventional analytics systems also have a limited ability to convey ramifications of each event. Game developers can write descriptive names for every event. The developers can also instrument or encode complex macro events, e.g., predetermined combinations of other events. However, the macro events are only triggered under specific predetermined circumstances and therefore may not contribute significantly to an overall understanding of a player's experience of playing the game. Although adding additional (and more complex) macro events provides a better understanding of the events in the game and the player's experience, each additional level of complexity in the analytics system requires an exponentially increasing development cost.

Against this background the proposed solution in particular to a computer-implemented method, in which a processor executes program code that represents a portion of a video game and adds a sequence of text strings that represent game events to a text log during execution of the program code. The processor (or another processor that has access to the text log) performs a natural language processing (NLP) analysis of the text log—by executing an NLP analysis algorithm—to determine one or more characteristics of the portion of the video game. In some cases, the NLP analysis includes a sentiment analysis that attempts to determine characteristics of a player's experience while playing the video game, summarization technology that creates a human-readable summary of an aspect of the game or a portion of the video game, a semantic NLP ML algorithm in the semantic similarity modality to answer questions posed by an analyst regarding the player's experience during the video game, or grouping players in a multiplayer game based on their in-game behavior.

The proposed solution in particular relates to systems and techniques for analyzing complex game sequences at a high level of granularity by applying natural language processing (NLP) analysis techniques to a text log that represents previous game events using text strings that were triggered by the game events. For example, game tone analytics may be implement using natural language processing (NLP). Game tone analytics in this context may relate to assessing or determining characteristics of an experience that a game is evoking (or attempting to evoke) in a player at a specific time, interval, or point in the game. A text log includes a sequence of text strings that represent game events that have been stored during execution of the game while played by a target user during a portion (or the entirety) of the game. The text strings are added to the text log in response to occurrences of the corresponding game event. In some embodiments, game developers map game events to corresponding text strings using an application programming interface (API) to associate numbers, letters, words, or phrases with each event. The text strings are added to the text log in response to an entity, such as a game director, generating the event or action. In some embodiments, a character behavior engine uses a semantic NLP machine learning (ML) algorithm to generate responses to player actions (or sequences of actions). The input and responses are associated with text strings that are added to the text log in response to the character behavior engine generating a response that is performed by a character in the video game. In some embodiments, a generative grammar is used to generate natural language statements based on information produced by a conventional analytics system. In some embodiments, an image or video captioning model generates a natural language description of scenes in the videogame and interactions between entities in the scenes. Multiple instances of the captioning model are used to generate a natural language description of the scene viewed from different character perspectives or arbitrary perspectives. The natural language descriptions are added to the text log at predetermined intervals, in response to predetermined events, or at other times.

The NLP analysis is applied to the text log that represents the actions or events that occurred in a video game or during a portion of the video game. In some embodiments, the NLP analysis includes a sentiment analysis that attempts to determine characteristics of a player's experience or track meaningful concepts regarding the player's experience while playing the video game. For example, the sentiment analysis can be performed on the text log to assess levels of tension or calmness, disappointment or triumph, good or bad fortune, or characteristics that correspond to the events that transpire during gameplay. In some embodiments, the NLP analysis includes summarization technology that creates a human-readable summary of an aspect of the video game or a portion of the video game. In some embodiments, the NLP analysis includes using a semantic NLP ML algorithm in the semantic similarity modality to answer questions posed by an analyst regarding the player's experience during the video game. The semantic NLP ML algorithm can also be used to group players in a multiplayer game based on their in-game behavior such as grouping vengeful players together, grouping peaceful players together, or grouping players based on a target mix of characteristics such as a group that includes a peaceful player, a vengeful player, an adventurous player, and a cautious player. In some embodiments, the NLP analysis is used to construct an experience curve to guide subsequent iterations of the game.

The results generated by the NLP analysis can also be compared to the results of beta testing or focus groups. In some embodiments, one or more rules are used to modify the results provided by the NLP analysis technique based on the results of player interviews conducted after the beta testing or focus group. For example, if the NLP analysis of a portion of the video game indicates an "engaging" experience but the results of player interviews indicate that players feel bored or uninterested in that portion of the video game, a rule can be applied to modify the scores returned by the NLP analysis so that events in the portion of the game that previously indicated an "engaging" are associated with "boredom." When this rule is applied, the scoring produced by the NLP analysis increases the score of "boredom" in response to the portions of the text log that were previously associated with an "engaging" experience. Thus, subsequent NLP analysis of portions of the game that are similar to the portion used to establish the rule would likewise return a higher ranking for "boredom" relative to the ranking for "engaging."

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-8 disclose systems and techniques for analyzing complex game sequences at a high level of granularity by applying natural language processing (NLP) analysis techniques to a text log that represents previous game events using text strings that were triggered by the game events. A text log includes a sequence of text strings that represent game events that have transpired during a portion (or the entirety) of the game.

Figure 1:
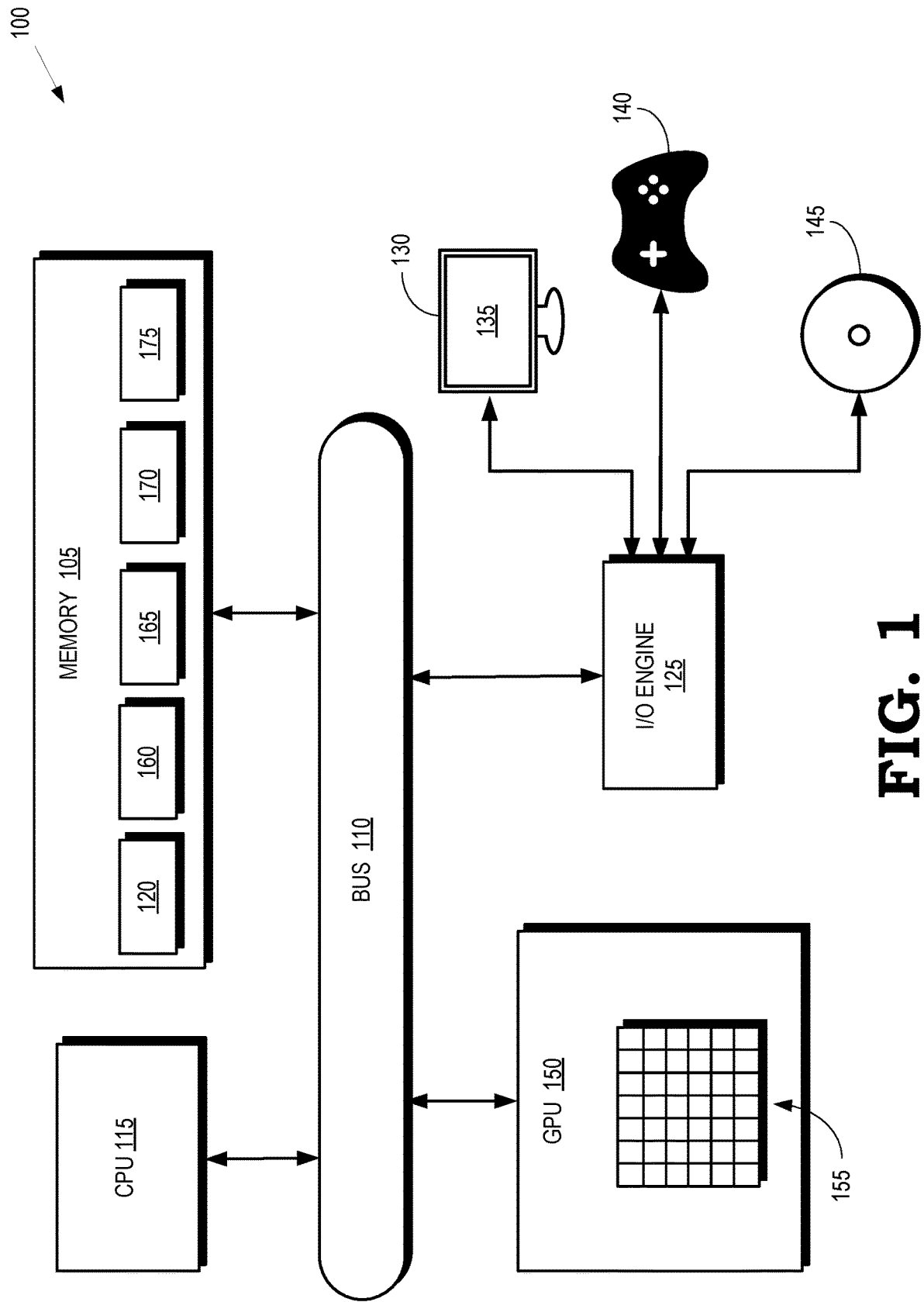
FIG. 1 is a block diagram of a video game processing system that supports game tone analytics using natural language processing (NLP) according to some embodiments.

FIG. 1 is a block diagram of a video game processing system 100 that supports game tone analytics using natural language processing (NLP) according to some embodiments. The processing system 100 includes or has access to a system memory 105 or other storage element that is implemented using a non-transitory computer readable medium such as a dynamic random-access memory (DRAM). However, some embodiments of the memory 105 are implemented using other types of memory including static RAM (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a central processing unit (CPU) 115. Some embodiments of the CPU 115 include multiple processing elements (not shown in FIG. 1 in the interest of clarity) that execute instructions concurrently or in parallel. The processing elements are referred to as processor cores, compute units, or using other terms. The CPU 115 is connected to the bus 110 and the CPU 115 communicates with the memory 105 via the bus 110. The CPU 115 executes instructions such as program code 120 stored in the memory 105 and the CPU 115 stores information in the memory 105 such as the results of the executed instructions. The CPU 115 is also able to initiate graphics processing by issuing draw calls.

An input/output (I/O) engine 125 handles input or output operations associated with a display 130 that presents images or video on a screen 135. In the illustrated embodiment, the I/O engine 125 is connected to a game controller 140 which provides control signals to the I/O engine 125 in response to a user pressing one or more buttons on the game controller 140 or interacting with the game controller 140 in other ways, e.g., using motions that are detected by an accelerometer. The I/O engine 125 also provides signals to the game controller 140 to trigger responses in the game controller 140 such as vibrations, illuminating lights, and the like. In the illustrated embodiment, the I/O engine 125 reads information stored on an external storage element 145, which is implemented using a non-transitory computer readable medium such as a compact disk (CD), a digital video disc (DVD), and the like. The I/O engine 125 also writes information to the external storage element 145, such as the results of processing by the CPU 115. Some embodiments of the I/O engine 125 are coupled to other elements of the processing system 100 such as keyboards, mice, printers, external disks, and the like. The I/O engine 125 is coupled to the bus 110 so that the I/O engine 125 communicates with the memory 105, the CPU 115, or other entities that are connected to the bus 110.

The processing system 100 includes a graphics processing unit (GPU) 150 that renders images for presentation on the screen 135 of the display 130, e.g., by controlling pixels that make up the screen 135. For example, the GPU 150 renders objects to produce values of pixels that are provided to the display 130, which uses the pixel values to display an image that represents the rendered objects. The GPU 150 includes one or more processing elements such as an array 155 of compute units that execute instructions concurrently or in parallel. Some embodiments of the GPU 150 are used for general purpose computing. In the illustrated embodiment, the GPU 150 communicates with the memory 105 (and other entities that are connected to the bus 110) over the bus 110. However, some embodiments of the GPU 150 communicate with the memory 105 over a direct connection or via other buses, bridges, switches, routers, and the like. The GPU 150 executes instructions stored in the memory 105 and the GPU 150 stores information in the memory 105 such as the results of the executed instructions. For example, the memory 105 stores instructions that represent a program code 160 that is to be executed by the GPU 150.

In the illustrated embodiment, the CPU 115 and the GPU 150 execute corresponding program code 120, 160 to implement a video game application. For example, user input received via the game controller 140 is processed by the CPU 115 to modify a state of the video game application. The CPU 115 then transmits draw calls to instruct the GPU 150 to render images representative of a state of the video game application for display on the screen 135 of the display 130. As discussed herein, the GPU 150 can also perform general-purpose computing related to the video game such as executing a physics engine or machine learning algorithm.

Some embodiments of the CPU 115 and the GPU 150 generate a text log 165 concurrently with executing the program code 120, 160 that represents the video game application. The text log 165 represents game events using text strings that are added to text log in response to being triggered by the game events. The text strings represent game events that have transpired during a portion (or the entirety) of the game. The text strings are added to the text log 165 in response to occurrences of the corresponding game event. In some embodiments, game events are associated with corresponding text strings and the text strings are added to the text log in response to an entity, such as a game director, generating an event or action. The CPU 115 or the GPU 150 adds the natural language descriptions to the text log 165 at predetermined intervals, in response to predetermined events, or at other times. The text log 165 is stored in the memory 105 for subsequent use by the CPU 115, the GPU 150, or another processor.

Some embodiments of the CPU 115, the GPU 150, or a combination thereof execute program code 170 that is used to perform NLP analysis. In some cases, the NLP analysis includes a sentiment analysis that attempts to determine characteristics of a player's (or a group of players') experience while playing the video game, summarization technology that creates a human-readable summary of an aspect of the video game or a portion of the video game, a semantic NLP ML algorithm in the semantic similarity modality to answer questions posed by an analyst regarding the player's (or a group of players') experience during the video game, or grouping players in a multiplayer game based on their in-game behavior. The semantic NLP ML algorithm is trained using a corpus of natural language data. Many text corpuses are available for training machine learning algorithms including corpuses related to media/product reviews, news articles, email/spam/newsgroup messages, tweets, dialogues, and the like. In the illustrated embodiment, the results of the NLP analysis are stored in a portion 175 of the memory 105, although this information or copies thereof are stored in other locations in some embodiments.

The illustrated embodiment of the video game processing system 100 is therefore used to establish an association or mapping between text strings and game events (e.g., using an API), generate a text log that includes the text strings that represent the game events, and perform game tone analytics on the text log. However, in some embodiments, one or more of these operations are performed using other processors. For example, a first processing system can be used to map the text strings to the game events using the API, a second processing system can be used to execute the program code that represents the video game and generates the text log, and a third processing system can be used to perform the game tone analytics using the text log.

Figure 2:
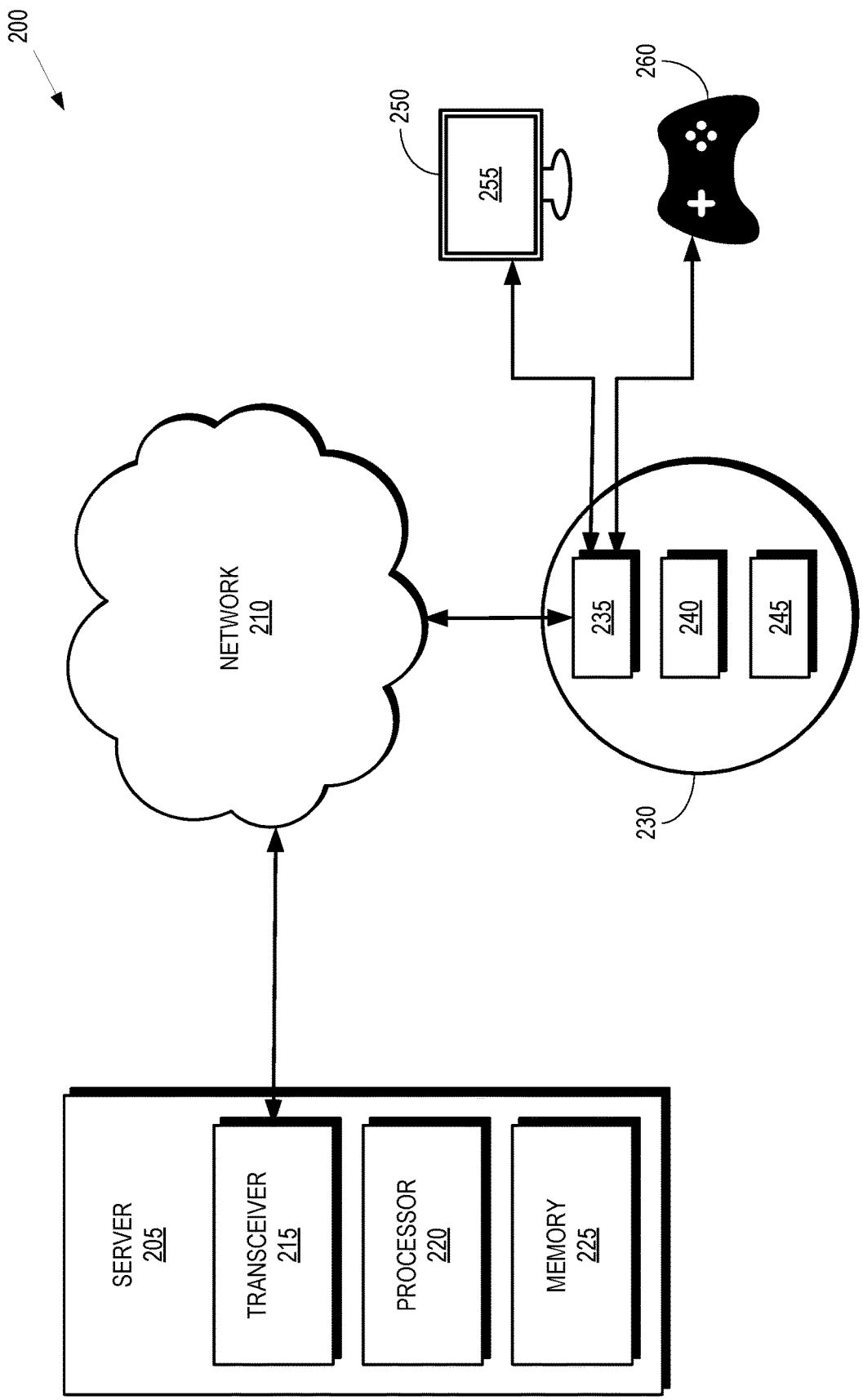
FIG. 2 is a block diagram of a cloud-based system that supports game tone analytics using natural language processing (NLP) according to some embodiments.

FIG. 2 is a block diagram of a cloud-based system 200 that supports game tone analytics using natural language processing (NLP) according to some embodiments. The cloud-based system 200 includes a server 205 that is interconnected with a network 210. Although a single server 205 shown in FIG. 2, some embodiments of the cloud-based system 200 include more than one server connected to the network 210. In the illustrated embodiment, the server 205 includes a transceiver 215 that transmits signals towards the network 210 and receives signals from the network 210. The transceiver 215 can be implemented using one or more separate transmitters and receivers. The server 205 also includes one or more processors 220 and one or more memories 225. The processor 220 executes instructions such as program code stored in the memory 225 and the processor 220 stores information in the memory 225 such as the results of the executed instructions.

The cloud-based system 200 includes one or more processing devices 230 such as a computer, set-top box, gaming console, and the like that are connected to the server 205 via the network 210. In the illustrated embodiment, the processing device 230 includes a transceiver 235 that transmits signals towards the network 210 and receives signals from the network 210. The transceiver 235 can be implemented using one or more separate transmitters and receivers. The processing device 230 also includes one or more processors 240 and one or more memories 245. The processor 240 executes instructions such as program code stored in the memory 245 and the processor 240 stores information in the memory 245 such as the results of the executed instructions. The transceiver 235 is connected to a display 250 that displays images or video on a screen 255 and a game controller 260. Some embodiments of the cloud-based system 200 are therefore used by cloud-based game streaming applications.

The processor 220, the processor 240, or a combination thereof execute program code to establish an association or mapping between text strings and game events (e.g., using an API), generate a text log that includes the text strings that represent the game events, and perform game tone analytics on the text log. The division of work between the processor 220 in the server 205 and the processor 240 in the processing device 230 differs in different embodiments. For example, the processor 220 can be used to map the text strings to the game events using the API. Coordinated operation of the processor 220 and the processor 240 is then used execute the program code that represents the video game and generate the text log. Once the video game (or portion thereof) is complete, the processor 220 can use the stored text log to perform the game tone analysis.

Figure 3:
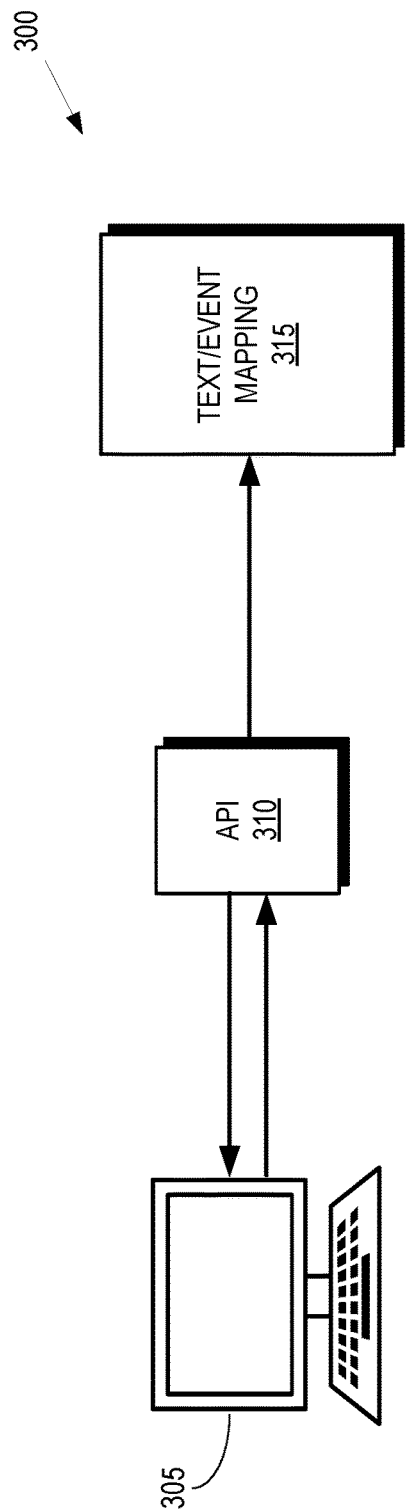
FIG. 3 is a block diagram of a processing system that maps events in a video game to corresponding text strings according to some embodiments.

FIG. 3 is a block diagram of a processing system 300 that maps events in a video game to corresponding text strings according to some embodiments. The processing system 300 is implemented in some embodiments of the video game processing system 100 shown in FIG. 1 and the cloud-based system 200 shown in FIG. 2. The processing system 300 includes a processor 305 that is implemented using some embodiments of the CPU 115 or the GPU 150 shown in FIG. 1, the processor 220 or the processor 240 shown in FIG. 2, or another processor.

An API 310 presents information to the processor 305 such as a set of game events supported by the video game and a set of suggested text strings to map to the game events. A user (e.g., a programmer or engineer) uses the API 310 to create a mapping between the game events and the text strings. In some embodiments, the user accepts the suggested strings, modifies the suggested text strings, or creates new text strings to associate with the game events. The API 310 stores the information that associates the text strings with the game events in a text/event mapping 315, which is stored in a memory such as the memory 105 shown in FIG. 1 or the memories 225, 245 shown in FIG. 2. The text/event mapping 315 is therefore accessible to the processor 305 or other processors, which uses the text/event mapping 315 to generate text logs, as discussed herein.

Figure 4:
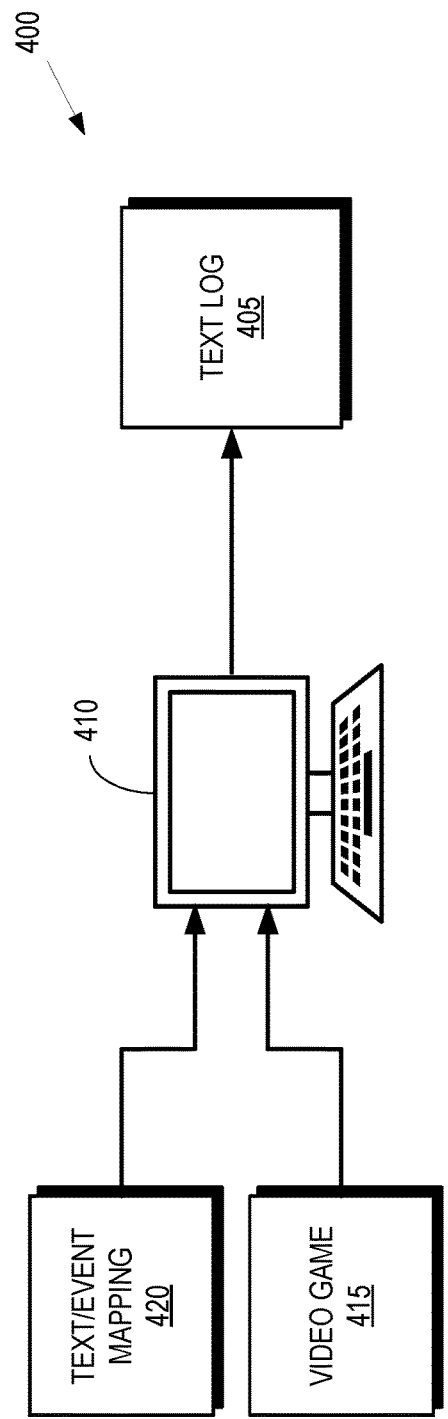
FIG. 4 is a block diagram of a processing system that generates a text log including text strings that represent events in a videogame according to some embodiments.

FIG. 4 is a block diagram of a processing system 400 that generates a text log 405 including text strings that represent events in a videogame according to some embodiments. The processing system 400 is implemented in some embodiments of the video game processing system 100 shown in FIG. 1 and the cloud-based system 200 shown in FIG. 2. The processing system 400 includes a computer 410 that is implemented using some embodiments of the CPU 115 or the GPU 150 shown in FIG. 1, the processor 220 or the processor 240 shown in FIG. 2, or other processor. The computer 410 can be the same physical device or a different physical device from the processor 305 shown in FIG. 3.

The computer 410 executes program code that represents a video game 415. The computer 410 generates one or more game events during execution of the program code of the video game 415. Concurrently with executing the video game 415, the computer 410 accesses a text/event mapping 420 that associates the game events for the video game with corresponding text strings. Each game event that occurs during runtime of the video game triggers the computer 410 to add the text string associated with the game event to a text log 405. In response to completing the video game (or a portion thereof), the computer 410 stores the text log 405 in a memory such as the memory 105 shown in FIG. 1 or the memories 225, 245 shown in FIG. 2. The text log 405 is therefore accessible to the computer 410 or other processors, which perform game tone analytics on the text log 405, as discussed herein.

Figure 5:
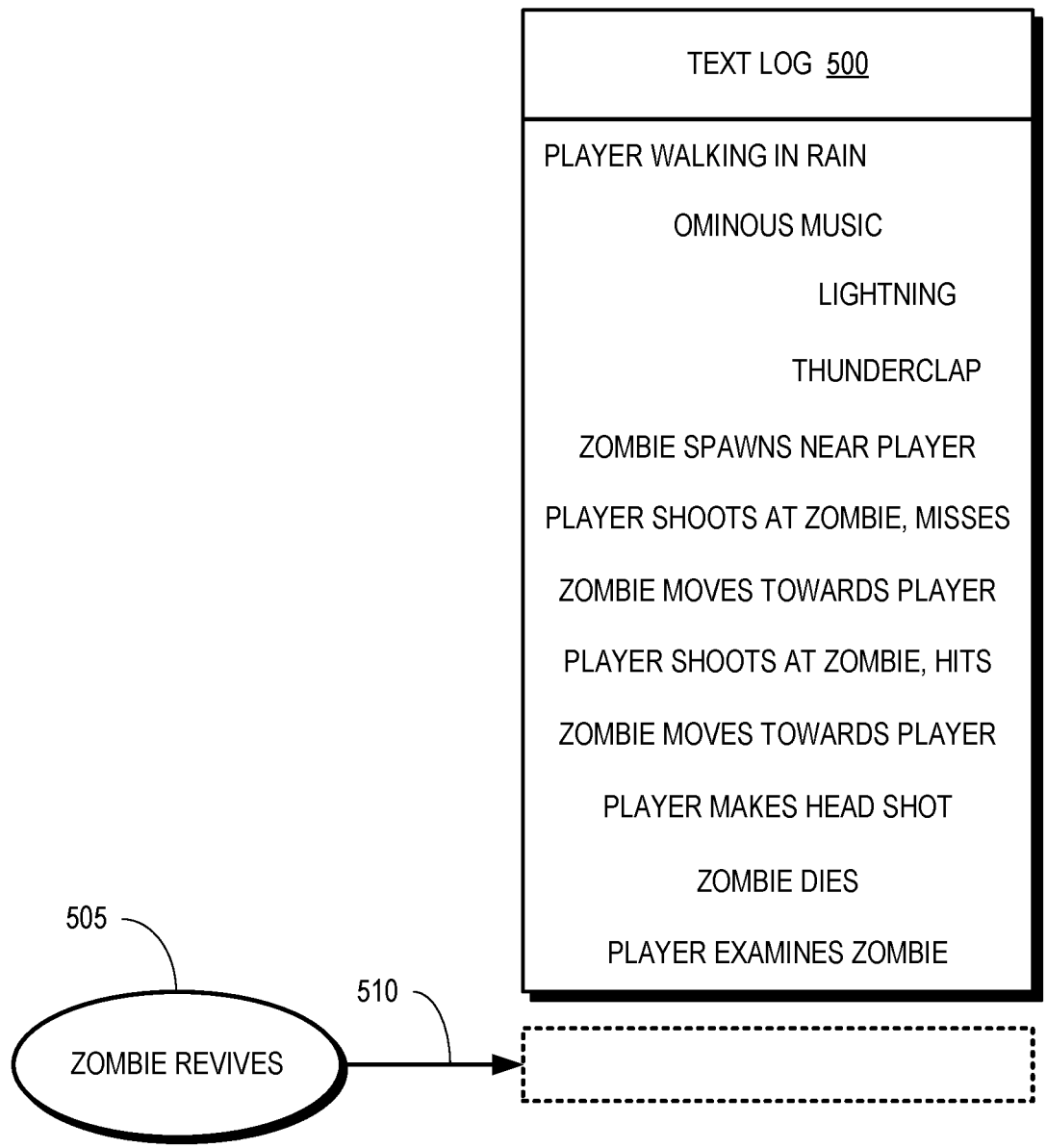
FIG. 5 is a block diagram that illustrates a text log made up of a sequence of text strings that represent events in the game according to some embodiments.

FIG. 5 is a block diagram that illustrates a text log 500 made up of a sequence of text strings that represent events in the game according to some embodiments. The text log 500 is generated by some embodiments of the GPU 150 shown in FIG. 1, the processors 220, 240 shown in FIG. 2, the processor 305 shown in FIG. 3, and the computer 410 shown in FIG. 4. For example, the text log 500 represents some embodiments of the text log 405 shown in FIG. 4. Some embodiments of the text log 500 are stored in a memory such as the system memory 105 shown in FIG. 1 and the memories 225, 245 shown in FIG. 2.

The text strings in the text log 500 represent a portion (or the entirety) of the game and indicate the player experience up to the current point in the game. As illustrated in FIG. 5, the events recorded in the text log 500 include information such as the information in Table 1, which includes a number identifying a text string associated with an event, a time at which the event occurs, and the text string representing the event.

TABLE 1

| Number | Time | Text String |
| --- | --- | --- |
| 1 | 0:00.00 | Player walking in rain |
| 2 | 0:00.00 | Ominous music |
| 3 | 0:30.00 | Lightning |
| 4 | 0:30.50 | Thunderclap |
| 5 | 0:32.00 | Zombie Spawns Near Player |
| 6 | 0:33.00 | Player Shoots Zombie, Misses |
| 7 | 0:33.10 | Zombie Moves Towards Player |
| 8 | 0:35:00 | Player Shoots Zombie, Hits |
| 9 | 0:35.10 | Zombie Moves Towards Player |
| 10 | 0:36.00 | Player Makes Headshot |
| 11 | 0:36.10 | Zombie Dies |
| 12 | 0:40.00 | Player Examines Zombie |

Additional text strings are added to the text log 500 in response to events occurring in the game. In the illustrated embodiment, an action 505 occurs that is represented by the text string "Zombie revives," which indicates that the zombie that appeared to be dead has returned from the grave (again). The processor then adds the text string representative of the action 505 to the text log 500, as indicated by the arrow 510.

Figure 6:
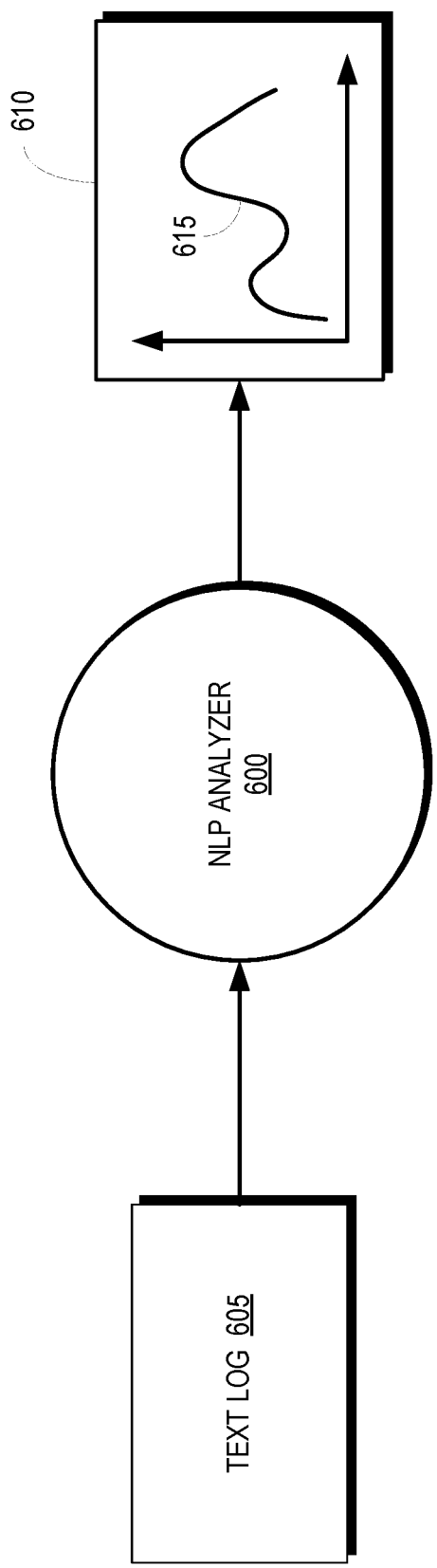
FIG. 6 includes a natural language processor (NLP) analyzer that analyzes a text log to determine characteristics of a portion of a video game according to some embodiments.

FIG. 6 includes a natural language processor (NLP) analyzer 600 that analyzes a text log 605 to determine characteristics of a portion of a video game according to some embodiments. The NLP analyzer 600 is implemented in some embodiments of the GPU 150 shown in FIG. 1, the processors 220, 240 shown in FIG. 2, the processor 305 shown in FIG. 3, and the computer 410 shown in FIG. 4. The NLP analyzer 600 is implemented in hardware, firmware, or software that is used to configure a processor, an application specific integrated circuit (ASIC), a field programmable gate array (FPGA), or other circuit. The NLP analyzer 600 accesses the text strings in the text log 605 and performs one or more analyses on the information stored in the text log 605. The NLP analyzer 600 also generates a digital representation 610 of information representative of the analysis. Some embodiments of the digital representation 610 are stored in a memory such as the system memory 105 shown in FIG. 1 and the memories 225, 245 shown in FIG. 2.

Some embodiments of the NLP analyzer 600 perform a sentiment analysis that generates a digital representation 610 that represents characteristics of a player's experience while playing the video game. For example, the sentiment analysis can be performed on the text log 605 to assess levels of tension or calmness, disappointment or triumph, good or bad fortune during the gameplay. Some embodiments of the NLP analyzer 600 implement summarization technology that creates a human-readable summary of an aspect of the game or a portion of the video game and the human-readable summary is provided as the digital representation 610. Some embodiments of the NLP analyzer 600 implement a semantic NLP ML algorithm in the semantic similarity modality to answer questions posed by an analyst regarding the player's experience during the video game. The responses generated by the semantic NLP ML algorithm are then provided as the digital representation 610. The semantic NLP ML algorithm can be used to assess each individual player's experience, each team's, and a spectator's experience. It can also be used to group players in a multiplayer game based on their in-game behavior such as grouping "vengeful" players together, grouping "peaceful" players together, or grouping players based on a target mix of characteristics such as a group that includes a "peaceful" player, a "vengeful" player, an "adventurous" player, and a "cautious" player. The groupings generated by the semantic NLP ML algorithm are then provided as the digital representation 610. Some embodiments of the NLP analyzer 600 construct an experience curve 615 to guide subsequent iterations of the game. The experience curve 615 is then provided as the digital representation 610, as shown in FIG. 6.

Figure 7:
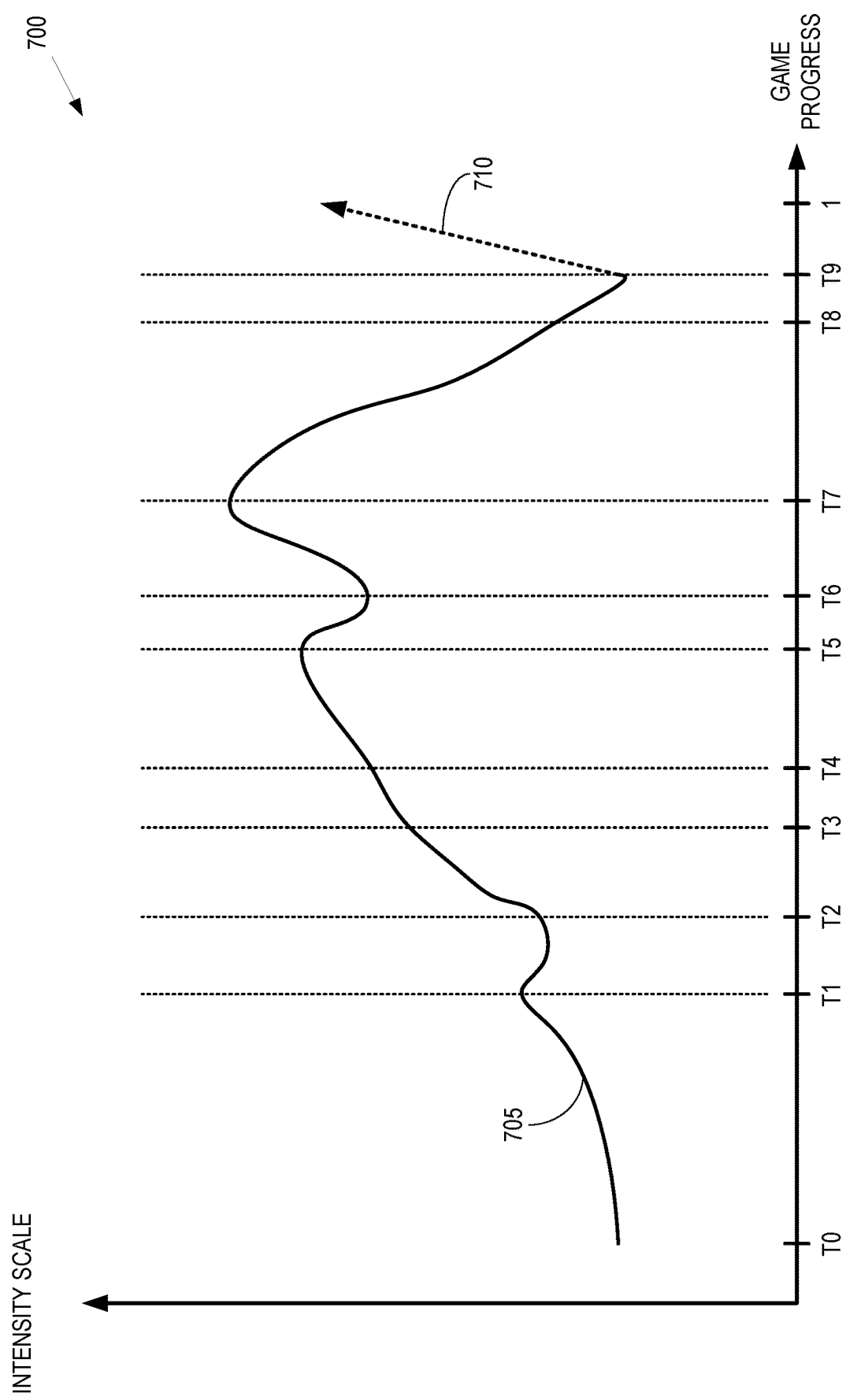
FIG. 7 is a plot of a curve that represents a player experience as a function of game progress according to some embodiments.

FIG. 7 is a plot 700 of a curve 705 that represents a player experience as a function of game progress according to some embodiments. The vertical axis of the plot 700 indicates a characteristic of a player experience (in arbitrary units) and the horizontal axis of the plot 700 indicates game progress from the beginning of the game (zero) to the end of the game (one). The curve 705 indicates a value of the characteristic of the player experience that is generated by an NLP analyzer (such as the NLP analyzer 600 shown in FIG. 6) based on a text log that represents the relevant portion of the video game, such as the text log 605 show in FIG. 6.

In the illustrated embodiment, the curve 705 represents a level of calm/intensity and points on the curve 705 correspond to the events represented by the text strings in the text log 500 shown in FIG. 5. However, in other embodiments, the curve 705 represents different target player experiences such as positive/negative sentiments, tracking of a semantic concept such as "victorious" or "sense of belonging," and the like.

Initially, at time T0, the target player experience is relatively calm as indicated by the relatively low value of the curve 705. The player begins to progress through the game and the environment experienced by the player is reflected in the text strings in the text log. For example, the text log indicates that the player is walking in the rain and ominous music is playing, which is intended to gradually raise the sense of intensity, as indicated by the increasing value of the curve 705 from T0 to T1.

At the time T1, the text log includes a text string indicating that lightning struck and there was a thunderclap. A small spike in the curve 705 around the time T1 indicates an increase in the intensity of the player experience corresponding to the lightning and thunder.

At the time T2, the text log includes a text string indicating that a zombie has spawned near the player. Adding a threatening character near the player is intended to increase the intensity of the player experience, as indicated by the curve 705 rising from time T2 to time T3.

At the time T3, the text log includes a text string indicating that the player attempted a shot at the zombie. However, the text string also indicates that the player missed the shot and so the intensity of the player experience continues to increase, as indicated by the curve 705 rising from time T3 to time T4.

At the time T4, the text log includes a text string indicating that the zombie continued to move towards the player. Reducing the distance between the zombie and the player increases the intensity of the player experience, as indicated by the curve 705 rising from time T4 to time T5.

At the time T5, the text log includes a text string indicating that the player attempted a shot at the zombie. The text string also indicates that the player's shot hit the zombie. Successfully shooting the zombie reduces the intensity of the player experience, as indicated by the curve 705 falling from time T4 to time T5.

At the time T6, the text log includes a text string indicating that the zombie is not dead and continued to move towards the player. Reducing the distance between the zombie and the player increases the intensity of the player experience, as indicated by the curve rising from time T6 to time T7.

At the time T7, the text log includes a text string indicating that the player attempted a shot at the zombie. The text string also indicates that the player's shot hit the zombie in the head and the zombie died. The successful headshot and death of the zombie reduce the intensity of the player experience, as indicated by the curve 705 falling from time T7 to time T8.

At the time T8, the text log includes a text string indicating that the player examined the dead zombie. The zombie appeared to be dead and the intensity of the player experience continued to decrease, as indicated by the curve 705 falling from time T8 to time T9.

At the time T9, the player is examining the "dead" zombie and the zombie revives, as shown in the action 505 in FIG. 5. The unexpected revival of the zombie causes the intensity of the player experience to spike, as indicated by the rising dashed arrow 710 after the time T9. The NLP analyzer detects the rise 710 by analyzing the text log after it has been modified to include the string that represents the action 505.

Figure 8:
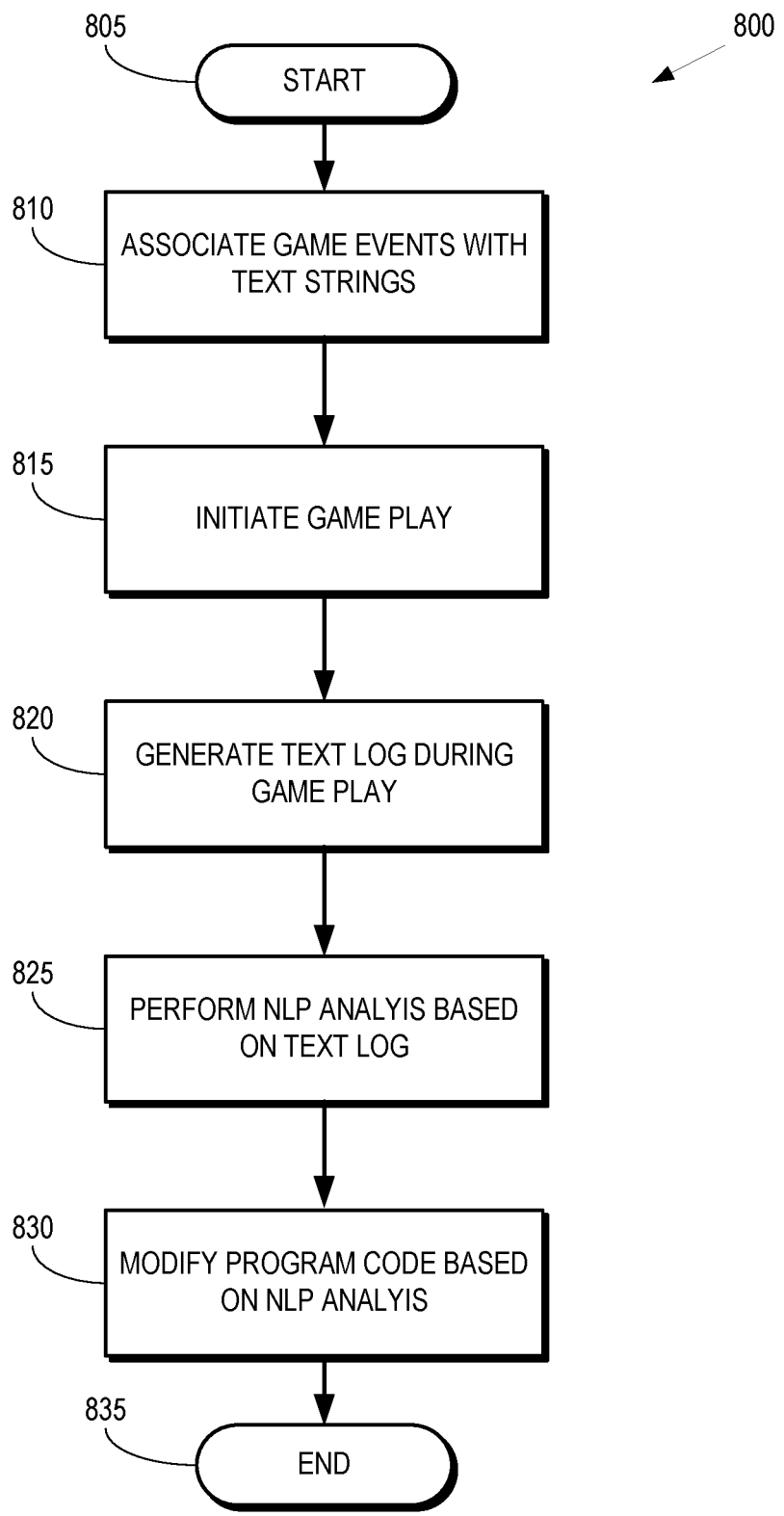
FIG. 8 is a flow diagram of a method of determining characteristics of a player experience during a video game according to some embodiments.

FIG. 8 is a flow diagram of a method 800 of determining characteristics of a player experience during a video game according to some embodiments. The method 800 is implemented in some embodiments of the GPU 150 shown in FIG. 1, the processors 220, 240 shown in FIG. 2, the processor 305 shown in FIG. 3, and the computer 410 shown in FIG. 4. As discussed herein, the method 800 is implemented in a single processor or in multiple processors that perform different subsets of the operations of the method 800.

The method 800 begins at the block 805. At block 810, a processor associates the events in the video game with text strings, e.g., using the processor 305 disclosed in FIG. 3 or another processor. In some embodiments, a user or player creates the text/event mapping using an API that is supported by the processor. The mapping is then stored in a memory.

At block 815, a processor initiates execution of the program code that is used to implement the video game. At block 820, the processor generates a text log based on events that occur in the video game and the mapping of game events to text strings, e.g., using the computer 410 shown in FIG. 4.

At block 825, a processor performs the NLP analysis on the text log, e.g., using the NLP analyzer 600 shown in FIG. 6. The NLP analysis can be performed concurrently with execution of the video game or subsequent to execution of the video game, e.g., using a stored copy of the text log. A digital representation of the results of the NLP analysis are then stored in a memory.

At block 830, program code is modified based on the results of the NLP analysis. In some embodiments, the program code is used to implement the NLP analysis and modification of the program code is performed based on other measures of player experience such as the results of player interviews. For example, the results of the NLP analysis are compared to the other measures of player experience and used to modify the NLP analysis that is performed during subsequent execution of the video game. In some embodiments, modifying the program code includes modifying program code that represents the video game. For example, a story curve that is used to guide player experience during the video game can be generated or modified based on the results of the NLP analysis, including during the game's execution.

The method 800 ends at the block 835.

Figure 9:
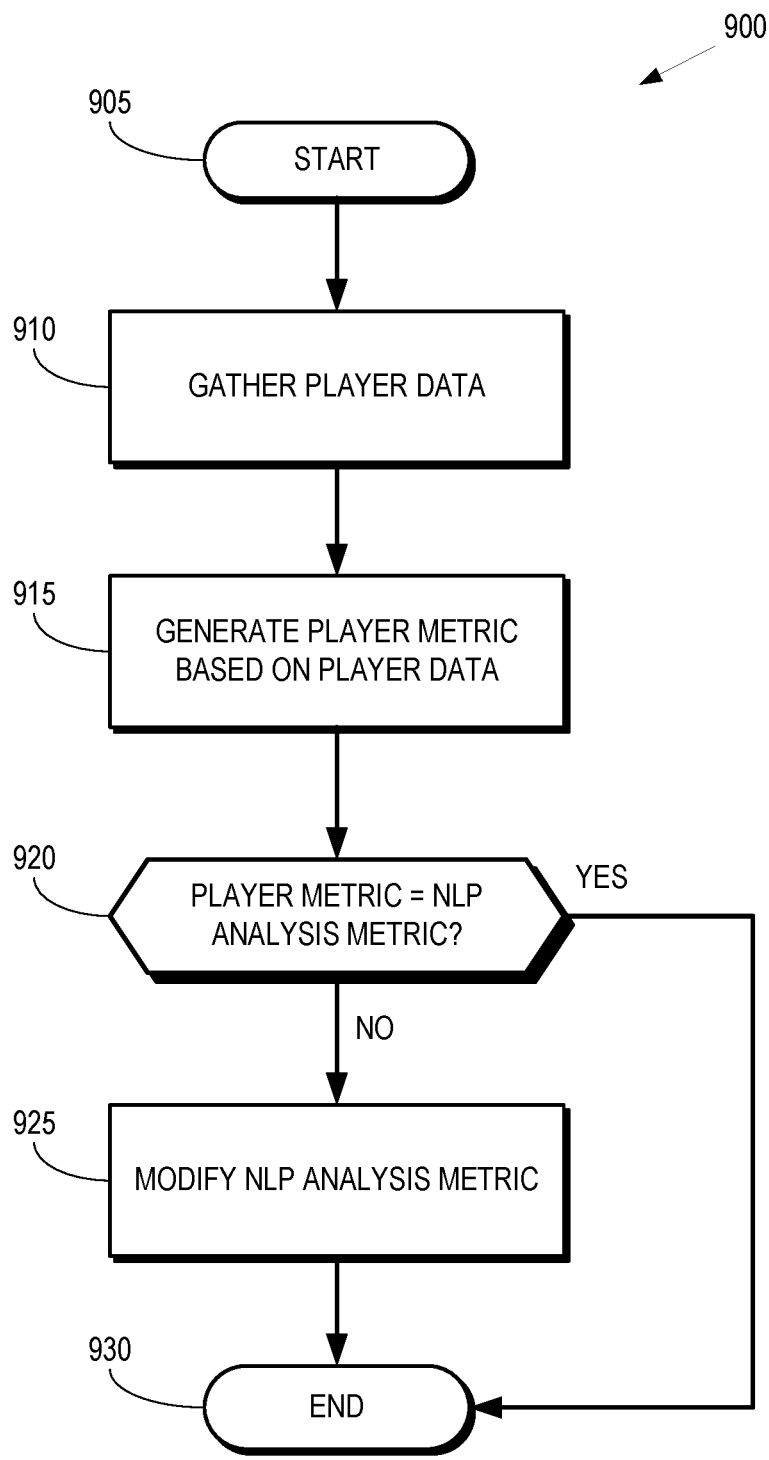
FIG. 9 is a flow diagram of a method for modifying the results returned by an NLP analysis based on a comparison with other measures of player experience according to some embodiments.

FIG. 9 is a flow diagram of a method 900 for modifying the results returned by an NLP analysis based on a comparison with other measures of player experience according to some embodiments. The method 900 is implemented in some embodiments of the GPU 150 shown in FIG. 1, the processors 220, 240 shown in FIG. 2, the processor 305 shown in FIG. 3, and the computer 410 shown in FIG. 4. In the illustrated embodiment, an NLP analysis has been performed on a text log generated concurrently with a player (or multiple players) playing in embodiment of the video game, e.g., as shown in FIG. 4. The results of the NLP analysis are stored in a memory that is accessible to the processor that implements the method 900. Data has also been gathered directly from the player (or players) regarding their experience of playing the video game.

The method 900 starts at block 905. At block 910, data is gathered from the player or group of players. The gathered data can be a text representation of the player experience, ground truth data such as heart rates or body temperatures that are measured during game play, or subjective reports from the player or players. For example, the heart rate and temperature of a player can be measured during a focus test of the game and visualized on a curve. For another example, a player can draw a curve of good and bad fortune during game play, labeling the peaks and troughs based on their recollection of their experience playing the game.

At block 915, one or more metrics are generated based on the player data. The metrics generated from the player data should correspond to the characteristics of the player experience that are represented by the results of the NLP analysis performed on the text log that was generated based on the events that occurred while the players were playing the same portion of the video game as the portion that is the basis of the data gathered from the players.

At decision block 920, the metrics generated based on the data obtained by the players are compared to the results of the NLP analysis performed on the text log. If the metrics are not substantially equivalent to the results of the NLP analysis, the method 900 flows to the block 925. If the metrics are substantially equivalent to the results of the NLP analysis, the method 900 flows to the block 930 and the method 900 ends. As used herein, the term "substantially equivalent" is used to refer to characteristics that are considered equivalent and therefore do not indicate that the actual player experience (as indicated by the player metrics) differ significantly from the measured player experience (as indicated by the NLP analysis). For example, a value of the metric represented by "happy" can be substantially equivalent to a value of a result of the NLP analysis that is represented by "glad." However, a value of the metric represented by "happy" may not be considered substantially equivalent to a value of a result of the NLP analysis that is represented by "sad."

At the block 925, the results of the NLP analysis are modified based on the player metrics. In some embodiments, one or more rules are generated to modify the results of the NLP analysis so that they are substantially equivalent to the player metrics. The rules are then applied to modify the results of subsequent NLP analyses of text logs. In some embodiments, a developer revises or modifies mappings of game events to a text log to make the adjustments to the results generated by the NLP analysis.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method for implementation by at least one processor, the method comprising:
    executing program code that represents a portion of an application;
    adding a sequence of text strings that represent events application to a text log during execution of the program code;
    generating, based on a captioning model, a natural language description of at least one of a scene in the application and an interaction between entities in the scene;
    adding the natural language description to the text log;
    executing a natural language processing (NLP) analysis algorithm to perform an NLP analysis of the text log to determine at least one characteristic of the portion of the application, wherein performing the NLP analysis of the text log includes performing a sentiment analysis of the text log to determine characteristics of a user's experience while using the application; and
    modifying program code that represents at least one of the NLP analysis algorithm or the portion of the application based on the analysis of the text log.

2. The computer-implemented method of claim 1, further comprising:
    using an application programming interface (API) to associate the events with text strings including at least one of numbers, letters, words, or phrases.

3. The computer-implemented method of claim 1, wherein adding the sequence of text strings to the text log comprises adding the sequence of text strings to the text log in response to a director generating the events, wherein the director is implemented using a portion of the program code.

4. The computer-implemented method of claim 1, wherein the application is a videogame and wherein executing the program code comprises executing a character behavior engine that uses a semantic NLP machine learning (ML) algorithm to generate a response to an input that represents a user action.

5. The computer-implemented method of claim 4, wherein adding the sequence of text strings to the text log comprises adding a first text string associated with the input to the text log and adding a second text string associated with the response to the text log in response to the character behavior engine generating the response.

6. The computer-implemented method of claim 1, further comprising:
    generating, using a generative grammar, natural language statements based on information produced by a conventional analytics system; and
    adding the natural language statements to the text log.

7. The computer-implemented method of claim 1, wherein the application is a video game and wherein generating the natural language description comprises using a plurality of instances of the captioning model are used to generate the natural language description of the scene viewed from a plurality of character perspectives or arbitrary perspectives.

8. The computer-implemented method of claim 1, wherein performing the NLP analysis to determine the at least one characteristic comprises generating a human-readable summary of an aspect of the application or a portion of the application based on the text log.

9. The computer-implemented method of claim 1, wherein performing the NLP analysis to determine at least one characteristic comprises answering questions regarding the user's experience during the application by applying a semantic NLP ML algorithm in a semantic similarity modality based on the text log.

10. The computer-implemented method of claim 1, wherein performing the NLP analysis to determine at least one characteristic comprises grouping players in a multi-player video game based on in-game behavior of the players that is inferred from the text log.

11. The computer-implemented method of claim 1, wherein performing the NLP analysis comprises constructing an experience curve based on the text log.

12. The computer-implemented method of claim 1, further comprising:
    comparing the at least one characteristic of the application to results of beta testing or focus groups for the application; and
    defining at least one rule to modify the NLP analysis algorithm based on the comparing.

13. A non-transitory computer readable medium embodying a set of executable instructions, the set of executable instructions to manipulate at least one processor to perform the method of claim 1.

14. An apparatus comprising:
    a memory configured to store a text log comprising a sequence of text strings that represent events that occurred during execution of program code that represents a portion of an application; and
    at least one processor configured to:
        generate, based on a captioning model, a natural language description of at least one of a scene in the application and an interaction between entities in the scene;
        add the natural language description to the text log;
        perform a natural language processing (NLP) analysis of the text log to determine at least one characteristic of the portion of the application by:
            executing an NLP analysis algorithm; and
            performing a sentiment analysis of the text log to determine characteristics of a user's experience while using the application; and
        modify program code that represents at least one of the NLP analysis algorithm or the portion of the application based on the analysis of the text log.

15. The apparatus of claim 14, wherein the processor is configured to support an application programming interface (API) for associating the events with text strings including at least one of numbers, letters, words, or phrases.

16. The apparatus of claim 14, wherein the text strings are added to the log in response to a director generating the events, wherein the director is implemented using a portion of the program code.

17. The apparatus of claim 14, wherein the application is a video game and where processor is configured to execute the program code, and wherein the program code represents a character behavior engine that uses a semantic NLP machine learning (ML) algorithm to generate a response to an input that represents a user action.

18. The apparatus of claim 17, wherein the processor is configured to add a first text string associated with the input to the text log, and wherein the processor is configured to add a second text string associated with the response to the text log in response to the character behavior engine generating the response.

19. The apparatus of claim 14, wherein the processor is configured to:
generate, using a generative grammar, natural language statements based on information produced by a conventional analytics system; and
add the natural language statements to the text log.

20. The apparatus of claim 14, wherein the application is a video game and wherein processor is configured to execute a plurality of instances of the captioning model are used to generate the natural language description of the scene viewed from a plurality of character perspectives or arbitrary perspectives.

21. The apparatus of claim 14, wherein the processor is configured to generate a human-readable summary of an aspect of the application or a portion of the application based on the text log.

22. The apparatus of claim 14, wherein the processor is configured to track meaningful concepts regarding the user's experience during the application by applying a semantic NLP ML algorithm in a semantic similarity modality based on the text log.

23. The apparatus of claim 14, wherein the processor is configured to group players in a multiplayer video game based on in-game behavior of the players that is inferred from the text log.

24. The apparatus of claim 14, wherein the processor is configured to construct an experience curve based on the text log.

25. The apparatus of claim 14, wherein the processor is configured to:
compare the at least one characteristic of the application to results of beta testing or focus groups for the application; and
define at least one rule to modify the NLP analysis algorithm based on the comparing.

\* \* \* \* \*